US012803271B2

(12) United States Patent
Yan et al.

(10) Patent No.: US 12,803,271 B2
(45) Date of Patent: Nov. 17, 2026

(54) PHOTOVOLTAIC INVERTER SYSTEM AND LIGHTNING PROTECTION APPARATUS

(71) Applicant: Huawei Digital Power Technologies Co., Ltd., Shenzhen (CN)

(72) Inventors: Yang Yan, Shenzhen (CN); Luo Li, Xi'an (CN); Weiping Liu, Shenzhen (CN); Gun Yang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 114 days.

(21) Appl. No.: 19/023,153

(22) Filed: Jan. 15, 2025

(65) Prior Publication Data

US 2025/0167540 A1 May 22, 2025

Related U.S. Application Data

(63) Continuation of application No. PCT/CN2023/134712, filed on Nov. 28, 2023.

(30) Foreign Application Priority Data

Dec. 27, 2022 (CN) ......................... 202211687223.0

(51) Int. Cl.
*H02H 7/20* (2006.01)
*H02H 9/04* (2006.01)
(Continued)

(52) U.S. Cl.
CPC .............. *H02H 7/20* (2013.01); *H02H 9/041* (2013.01); *H02H 9/06* (2013.01); *H02S 40/30* (2014.12);
(Continued)

(58) Field of Classification Search
CPC .......... H02H 9/04; H02H 9/041; H02H 9/045; H02H 9/06; H02H 7/20; H02S 40/30;
(Continued)

(56) References Cited

U.S. PATENT DOCUMENTS 8,390,977 B2 * 3/2013 Fife .......................... H02H 9/04 361/118
2008/0238195 A1 * 10/2008 Shaver .................. H02H 9/041 307/18
(Continued)

FOREIGN PATENT DOCUMENTS

CN 110048590 A 7/2019
CN 113922652 A 1/2022
(Continued)

OTHER PUBLICATIONS

Translation of EP 2 276 136 B2. Apr. 4, 2018. (Year: 2018).*

*Primary Examiner* — Thienvu V Tran
*Assistant Examiner* — Christopher J Clark
(74) *Attorney, Agent, or Firm* — Leydig, Voit & Mayer, Ltd.

(57) ABSTRACT

A photovoltaic inverter system includes a lightning protection apparatus, an inverter circuit, and a plurality of DC/DC conversion circuits connected in parallel and then connected to the inverter circuit. Each DC/DC conversion circuit is connected to a component. The lightning protection apparatus includes a gas lightning protection unit and a first lightning protection unit. The gas lightning protection unit is separately connected to a first terminal of the component and a first terminal of another component. The first lightning protection unit is connected between the first terminal of the component and a grounding terminal. The gas lightning protection unit is configured to transmit, to the first lightning protection unit, a first current, namely a current introduced by any terminal of the another component. The first lightning protection unit is configured to transmit the first current and/or a second current to the grounding terminal.

16 Claims, 5 Drawing Sheets

(51) Int. Cl.
*H02H 9/06* (2006.01)
*H02S 40/30* (2014.01)
*H02J 101/24* (2026.01)
*H02M 1/00* (2006.01)

(52) U.S. Cl.
CPC ........ *H02J 2101/25* (2026.01); *H02M 1/0067* (2021.05)

(58) Field of Classification Search
CPC .. H02J 3/38; H10F 19/00; H10F 19/50; H10F 77/955; H02M 1/0067
See application file for complete search history.

(56) References Cited

U.S. PATENT DOCUMENTS

| | | | | |
|---|---|---|---|---|
| 2022/0140781 | A1* | 5/2022 | Zhang | H02J 1/102 136/243 |
| 2022/0329064 | A1* | 10/2022 | Wang | H02H 9/041 |

FOREIGN PATENT DOCUMENTS

| | | | | | |
|---|---|---|---|---|---|
| CN | 113991612 | A | | 1/2022 | |
| CN | 116094450 | A | | 5/2023 | |
| DE | 102012022919 | A1 | | 5/2014 | |
| EP | 2276136 | B2 | * | 4/2018 | H02H 7/1222 |

* cited by examiner

PHOTOVOLTAIC INVERTER SYSTEM AND LIGHTNING PROTECTION APPARATUS

CROSS-REFERENCE TO RELATED APPLICATION

This application is a continuation of International Application No. PCT/CN2023/134712, filed on Nov. 28, 2023, which claims priority to Chinese Patent Application No. 202211687223.0, filed on Dec. 27, 2022. The disclosures of the aforementioned applications are hereby incorporated by reference in their entireties.

TECHNICAL FIELD

Embodiments of this application relate to the field of lightning protection technologies, and in particular, to a photovoltaic inverter system and a lightning protection apparatus.

BACKGROUND

Currently, a direct current input terminal of a string inverter circuit usually includes devices such as a power generation module, a cable, and the like. To ensure safety of a power system, a lightning protection capability is required for a direct current input terminal of the string inverter circuit. For example, the inverter circuit is equipped with a lightning protection device of a specific specification, so that the inverter circuit can withstand impact of a lightning strike at the direct current input terminal, ensuring that the inverter circuit is not damaged.

A photovoltaic inverter circuit with six photovoltaic inputs is used as an example. A current common practice is: Two photovoltaic power generation modules are connected to one maximum power tracking apparatus; each of a positive input and a negative input of each maximum power tracking apparatus is connected to one lightning protection device, for example, a lightning protector or a varistor; then all lightning protector devices are connected to a common point, and the common point is grounded through one lightning protection device.

Therefore, an inverter system with more inputs needs more lightning protection devices. The lightning protection devices are expensive and large in size. As a result, the entire system is larger in size and manufacturing costs are increased.

SUMMARY

Embodiments of this application provide a photovoltaic inverter system and a lightning protection apparatus, to resolve a problem that a lightning protection apparatus occupies large space.

According to a first aspect, embodiments of this application provide a photovoltaic inverter system, including a lightning protection apparatus, a plurality of DC/DC conversion circuits, and an inverter circuit. A positive input terminal and a negative input terminal of each of the plurality of DC/DC conversion circuits are configured to respectively connect to a positive output terminal and a negative output terminal of a photovoltaic module. The positive output terminals of the plurality of DC/DC conversion circuits are connected in parallel and the negative output terminals of the plurality of DC/DC conversion circuits are connected in parallel, and then connected to input terminals of the inverter circuit. An output terminal of the inverter circuit is configured to connect to a power load or a power grid.

The lightning protection apparatus includes a gas lightning protection unit and a first lightning protection unit, where the gas lightning protection unit includes at least one gas discharge tube.

A first terminal of the gas lightning protection unit is connected to a first terminal of the photovoltaic module. A second terminal of the gas lightning protection unit is connected to a first terminal of one or more other photovoltaic module. The first lightning protection unit is connected between the first terminal of the photovoltaic module and a grounding terminal.

The gas lightning protection unit is configured to transmit a first current to the first lightning protection unit, where the first current is a lightning strike current introduced by a first terminal of any one of the one or more other photovoltaic module.

The first lightning protection unit is configured to transmit the first current and/or a second current to the grounding terminal, where the second current is a lightning strike current introduced by the first terminal of the photovoltaic module, the first terminal of the photovoltaic module is a positive output terminal or a negative output terminal of the photovoltaic module, and the first terminal of the one or more other photovoltaic module is an output terminal having a same polarity as the first terminal of the photovoltaic module.

Based on the foregoing technical solution, when a lightning strike current enters the inverter system, the gas lightning protection unit may be configured to transmit, to the first lightning protection unit, a lightning strike current introduced by the first terminal of any one of the one or more other photovoltaic module, to discharge the lightning strike current to the grounding terminal through the first lightning protection unit; and the first lightning protection unit may also be configured to discharge, to the grounding terminal, a lightning strike current introduced by the first terminal of the photovoltaic module.

A starting voltage of the gas discharge tube is increased after the gas discharge tube is connected to the first lightning protection unit in series. However, the starting voltage of the gas discharge tube is relatively low, not causing the lightning strike current to fail to turn on the gas discharge tube. For example, if a varistor is connected to the first lightning protection unit in series, because starting voltages of the varistor and a lightning protection device in the first lightning protection unit are relatively high, the gas discharge tube cannot be turned on by the lightning strike current.

Further, because the first terminal of the photovoltaic module and the first terminal of the one or more other photovoltaic module are connected to a first terminal of the inverter circuit through the DC/DC conversion circuit, and the second terminal of the photovoltaic module and the second terminal of the one or more other photovoltaic module are connected to a second terminal of the inverter circuit through the DC/DC conversion circuit, that is, a terminal of the photovoltaic module is directly connected to a terminal of the one or more other photovoltaic module that has a same polarity as the terminal of the photovoltaic module, an electric potential difference between two terminals of the gas lightning protection unit is small, and when no lightning strike current enters, no other current that causes the gas lightning protection unit to work abnormally is transmitted to the gas lightning protection unit.

In addition, because the gas discharge tube is small in size, a size of the lightning protection apparatus is reduced, a size of the lightning protection apparatus is effectively reduced, and manufacturing costs are reduced.

In a possible implementation, the gas lightning protection unit includes at least one gas lightning protection branch circuit. Each gas lightning protection branch circuit includes a gas discharge tube. A first terminal of each gas lightning protection branch circuit forms a first terminal of the gas lightning protection unit, and a second terminal of each gas lightning protection branch circuit forms a second terminal of the gas lightning protection unit.

Based on the foregoing technical solution, the electric potential difference between the two terminals of the gas lightning protection branch circuit is small. This avoids a case in which because the starting voltage of the gas discharge tube is relatively low, when no lightning strike current enters, the gas discharge tube is abnormally turned on due to another current input.

In addition, when a voltage of the lightning strike current is higher than a breakdown voltage of the gas discharge tube, the gas discharge tube is transiently short-circuited, and leads, to the ground for discharging, a lightning strike current introduced by a first terminal of any one of the one or more other photovoltaic module and a lightning strike current introduced by the first terminal of the photovoltaic module. Compared with a lightning arrester or a varistor used in a conventional lightning protection apparatus, the gas discharge tube has characteristics of low costs and a small size, so that a quantity of lightning protection devices such as a lightning arrester or a varistor required by the lightning protection apparatus is reduced, an occupied space of the lightning protection apparatus is reduced for convenient installation, and costs are reduced.

In a possible implementation, the lightning protection apparatus further includes a second lightning protection unit.

A first terminal of the second lightning protection unit is separately connected to a second terminal of the photovoltaic module and a second terminal of each of the one or more other photovoltaic module, and a second terminal of the second lightning protection unit is connected to the grounding terminal.

The second lightning protection unit is configured to transmit a third current to the grounding terminal, where the third current is a lightning strike current introduced by the second terminal of the photovoltaic module or a second terminal of the any one of the one or more other photovoltaic module.

Based on the foregoing technical solution, the second lightning protection unit may be configured to discharge, to the grounding terminal for lightning protection, the lightning strike current introduced by the second terminal of the photovoltaic module or the second terminal of the one or more other photovoltaic module.

In a possible implementation, the second lightning protection unit includes at least two lightning protection branch circuits. The lightning protection branch circuit includes a lightning protection device. A first terminal of each lightning protection branch circuit forms a first terminal of the second lightning protection unit, and a second terminal of each lightning protection branch circuit forms a second terminal of the second lightning protection unit.

In a possible implementation, the lightning protection apparatus further includes a grounding lightning protection unit.

A first terminal of the grounding lightning protection unit is separately connected to a second terminal of the first lightning protection unit and the second terminal of the second lightning protection unit. A second terminal of the grounding lightning protection unit is connected to the grounding terminal.

The grounding lightning protection unit is configured to transmit a received fourth current to the grounding terminal, where the fourth current is the second current of a differential-mode type or the third current of a differential-mode type.

When a lightning strike current is introduced from a power generation apparatus, a lightning strike current of a common-mode type or a lightning strike current of a differential-mode type may be formed depending on different return paths. When a lightning strike current is of the differential-mode type, the grounding lightning protection unit may be configured in the lightning protection apparatus, to transmit the received differential-mode current to the grounding terminal for lightning protection.

According to a second aspect, embodiments of the present invention provide a lightning protection apparatus, applied to a photovoltaic inverter system. The photovoltaic inverter system includes a plurality of DC/DC conversion circuits and an inverter circuit. A positive input terminal and a negative input terminal of each of the plurality of DC/DC conversion circuits are configured to respectively connect to a positive output terminal and a negative output terminal of a photovoltaic module. The positive output terminals of the plurality of DC/DC conversion circuits, connected in parallel, and the negative output terminals of the plurality of DC/DC conversion circuits, connected in parallel, are connected to input terminals of the inverter circuit. An output terminal of the inverter circuit is configured to connect to a power load or a power grid.

The lightning protection apparatus includes a gas lightning protection unit and a first lightning protection unit, where the gas lightning protection unit includes at least one gas discharge tube.

A first terminal of the gas lightning protection unit is connected to a first terminal of the photovoltaic module. A second terminal of the gas lightning protection unit is connected to a first terminal of one or more other photovoltaic module. The first lightning protection unit is connected between the first terminal of the photovoltaic module and a grounding terminal.

The gas lightning protection unit is configured to transmit a first current to the first lightning protection unit, where the first current is a lightning strike current introduced by a first terminal of any one of the one or more other photovoltaic module.

The first lightning protection unit is configured to transmit the first current and/or a second current to the grounding terminal, where the second current is a lightning strike current introduced by the first terminal of the photovoltaic module, the first terminal of the photovoltaic module is a positive output terminal or a negative output terminal of the photovoltaic module, and the first terminal of the one or more other photovoltaic module is an output terminal having a same polarity as the first terminal of the photovoltaic module.

In a possible implementation, the gas lightning protection unit includes at least one gas lightning protection branch circuit. Each gas lightning protection branch circuit includes a gas discharge tube. A first terminal of each gas lightning protection branch circuit forms a first terminal of the gas lightning protection unit, and a second terminal of each gas lightning protection branch circuit forms a second terminal of the gas lightning protection unit.

In a possible implementation, the lightning protection apparatus further includes a second lightning protection unit.

A first terminal of the second lightning protection unit is separately connected to a second terminal of the photovoltaic module and a second terminal of each of the one or more other photovoltaic module, and a second terminal of the second lightning protection unit is connected to the grounding terminal.

The second lightning protection unit is configured to transmit a third current to the grounding terminal, where the third current is a lightning strike current introduced by a second terminal of the photovoltaic module or a second terminal of the one or more other photovoltaic module.

In a possible implementation, the second lightning protection unit includes at least two lightning protection branch circuits. The lightning protection branch circuit includes a lightning protection device. A first terminal of each lightning protection branch circuit forms a first terminal of the second lightning protection unit, and a second terminal of each lightning protection branch circuit forms a second terminal of the second lightning protection unit.

In a possible implementation, the lightning protection apparatus further includes a grounding lightning protection unit.

A first terminal of the grounding lightning protection unit is separately connected to a second terminal of the first lightning protection unit and the second terminal of the second lightning protection unit. A second terminal of the grounding lightning protection unit is connected to the grounding terminal.

The grounding lightning protection unit is configured to transmit a received fourth current to the grounding terminal, where the fourth current is the second current of a differential-mode type or the third current of a differential-mode type.

DESCRIPTION OF EMBODIMENTS

Figure 1:
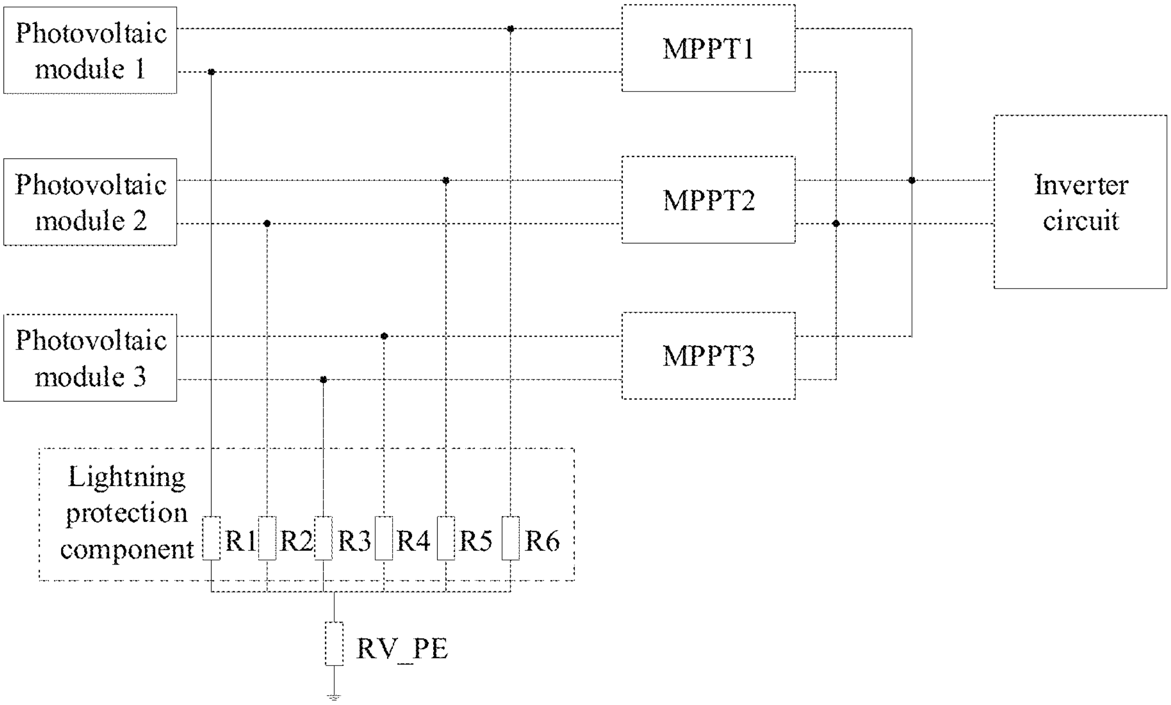
FIG. 1 is a schematic diagram of a structure of a lightning protection apparatus.

To make the objectives, technical solutions, and advantages of this application clearer, the following embodiments further describe this application in detail with reference to the accompanying drawings.

The following detailed descriptions of embodiments of this application provided in the accompanying drawings are not intended to limit the scope of the claimed application, but merely to represent selected embodiments of this application. All other embodiments obtained by a person of ordinary skill in the art based on embodiments of this application without creative efforts shall fall within the protection scope of this application.

It should be noted that similar reference numerals and letters represent similar items in the following accompanying drawings, and therefore, once an item is defined in one of the accompanying drawings, no further definition or explanation is required in the following accompanying drawings.

In the descriptions of this application, it should be further noted that, unless otherwise specified and limited, terms "set", "mount", "interconnect", and "connect" should be understood in a broad sense. For example, such terms may indicate a fixed connection, a detachable connection, or an integral connection; may indicate a mechanical connection or an electrical connection; and may indicate direct interconnection, indirect interconnection through an intermediate medium, or internal communication between two elements. A person of ordinary skill in the art may understand specific meanings of the foregoing terms in this application based on a specific situation.

For ease of understanding embodiments of this application, the following first explains terms in embodiments of this application.

1. Gas Discharge Tube

A gas discharge tube is a gap-type lightning protection element, which is usually used for lightning protection of a communication system. A gas discharge tube is usually a lightning protection tube or an antenna switch tube used for overvoltage protection.

A gas discharge tube is provided with two or more electrodes, and filled with a specific amount of inert gas. When a specific voltage is applied between two electrodes of a gas discharge tube, an uneven electric field is generated between the electrodes. Under effect of this electric field, the gas in the tube starts to be ionized. When the applied voltage is increased so that a strength of the field between the electrodes exceeds a dielectric strength of the gas, electrical breakdown occurs at a gap between the two electrodes, and the tube changes from an original insulation state to a conductive state. In the conductive state, the voltage between the two electrodes of the discharge tube is maintained at a low residual voltage level determined by a discharge arc channel, so that an electronic device protected by the discharge tube is protected from overvoltage.

2. Maximum Power Point Tracking (MPPT)

Maximum power tracking in a photovoltaic power generation system is a control method in which an operating point of a photovoltaic power generation module is adjusted in real time, and by tracking and controlling a maximum power point of a solar cell, the photovoltaic power generation module always works near the maximum power point.

The maximum power tracking method is applied to improve overall power generation efficiency of the power generation system, improve cell conversion efficiency, and make full use of energy converted by the photovoltaic power generation module.

For ease of understanding embodiments of this application, the following describes an application scenario in embodiments of this application.

Currently, a direct current input terminal of a string inverter circuit usually includes devices such as a power generation module, a cable, and the like. To ensure safety of a power system, the inverter circuit is usually equipped with a lightning protection device of a specific specification. This ensures that the inverter circuit and a system in which the inverter circuit is located are not damaged when a lightning strike occurs at the direct current input terminal.

A photovoltaic inverter system with six photovoltaic inputs is used as an example. As shown in FIG. 1, the photovoltaic inverter system includes a photovoltaic module 1, a photovoltaic module 2, a photovoltaic module 3, a maximum power tracking apparatus MPPT1, a maximum power tracking apparatus MPPT2, a maximum power tracking apparatus MPPT3, and an inverter circuit. Each of the photovoltaic modules 1 to 3 is a power generation module with two outputs, and there are six outputs in total. The photovoltaic module 1 is connected to the maximum power tracking apparatus MPPT1; the photovoltaic module 2 is connected to the maximum power tracking apparatus MPPT2, and the photovoltaic module 3 is connected to the maximum power tracking apparatus MPPT3.

Further, as shown in FIG. 1, a conventional lightning protection apparatus includes a lightning protection component and a grounding lightning protection device RV_PE, and the lightning protection component includes six lightning protection devices R1 to R6. Each lightning protection device in the lightning protection component is connected between one output of any power generation module and the grounding lightning protection device RV_PE. The grounding lightning protection device RV_PE is connected to a grounding terminal, to discharge a lightning strike current introduced by a terminal of any one of the photovoltaic modules 1 to 3.

It is clear that, when the inverter system has six outputs, seven lightning protection devices are required. Therefore, an inverter system with more inputs needs more lightning protection devices. The lightning protection devices are expensive and large in size. As a result, the entire system is larger in size and manufacturing costs are increased.

In view of the foregoing application scenario, the following describes a lightning protection apparatus provided in this example implementation of this application with reference to the accompanying drawings. It should be noted that the foregoing application scenario is shown only for ease of understanding the spirit and principle of this application, and implementations of this application are not limited in this aspect.

Figure 2:
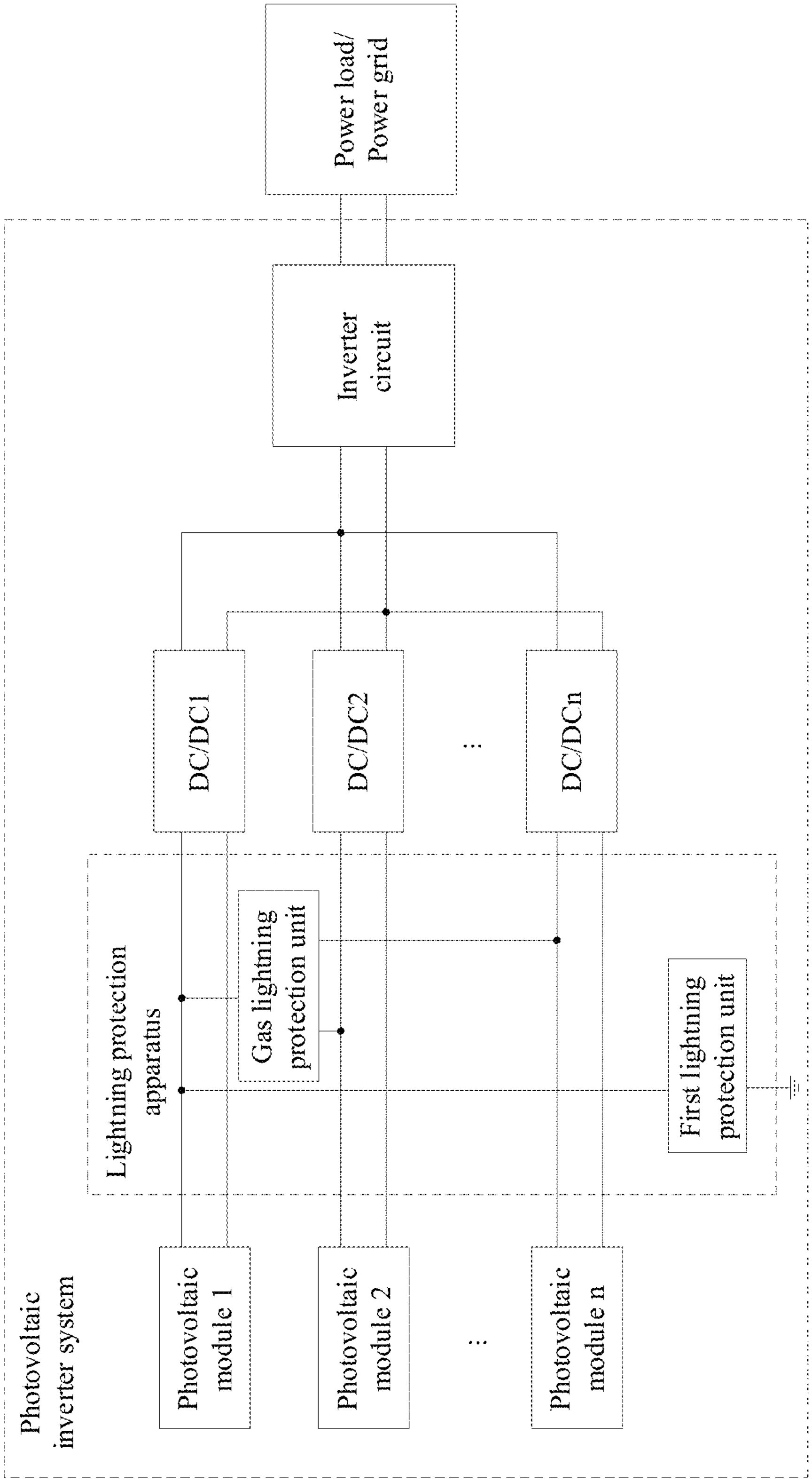
FIG. 2 is a schematic diagram of a structure of a photovoltaic inverter system according to an embodiment of this application.

FIG. 2 shows a photovoltaic inverter system according to an embodiment of this application. As shown in FIG. 2, the photovoltaic inverter system includes a lightning protection apparatus, a plurality of DC/DC conversion circuits (a DC/DC1 to a DC/DCn are shown as an example in FIG. 2), and an inverter circuit. A positive input terminal and a negative input terminal of each of the plurality of DC/DC conversion circuits are configured to respectively connect to a positive output terminal and a negative output terminal of a photovoltaic module (a photovoltaic module 1 is shown as an example in FIG. 2). The positive output terminals of the plurality of DC/DC conversion circuits, connected in parallel, and the negative output terminals of the plurality of DC/DC conversion circuits, connected in parallel, are connected to input terminals of the inverter circuit, and an output terminal of the inverter circuit is configured to connect to a power load or a power grid.

The lightning protection apparatus includes a gas lightning protection unit and a first lightning protection unit, where the gas lightning protection unit includes at least one gas discharge tube.

A first terminal of the gas lightning protection unit is connected to a first terminal of the photovoltaic module. A second terminal of the gas lightning protection unit is connected to a first terminal of one or more other photovoltaic module (a photovoltaic module 2 to a photovoltaic module n are used as an example in FIG. 2). The first lightning protection unit is connected between the first terminal of the photovoltaic module and a grounding terminal.

The gas lightning protection unit is configured to transmit a first current to the first lightning protection unit, where the first current is a lightning strike current introduced by a first terminal of any one of the one or more other photovoltaic module.

The first lightning protection unit is configured to transmit the first current and/or a second current to the grounding terminal, where the second current is a lightning strike current introduced by the first terminal of the photovoltaic module. The first terminal of the photovoltaic module is a positive output terminal or a negative output terminal of the photovoltaic module. The first terminal of the one or more other photovoltaic module is an output terminal having a same polarity as the first terminal of the photovoltaic module.

According to the photovoltaic inverter system disclosed in this application, when a lightning strike current enters the photovoltaic inverter system, the gas lightning protection unit transmits, to the first lightning protection unit, a lightning strike current introduced by the first terminal of any one of the one or more other photovoltaic module, to discharge the lightning strike current to the grounding terminal through the first lightning protection unit. The first lightning protection unit may also discharge, to the grounding terminal, a lightning strike current introduced by the first terminal of the photovoltaic module.

Because a starting voltage is increased after another lightning protection device and the first lightning protection unit are connected in series, in this solution, a gas discharge tube with a lower starting voltage is used to form the gas lightning protection unit. In this way, a voltage of a lightning strike current is to be not lower than the starting voltage, and this ensures normal start of the gas discharge tube and another lightning protection unit. For example, if a varistor and the first lightning protection unit are connected in series and a voltage of a lightning strike current is lower than the starting voltage in such series connection, the gas discharge tube and the another lightning protection unit cannot be started.

Figure 3:
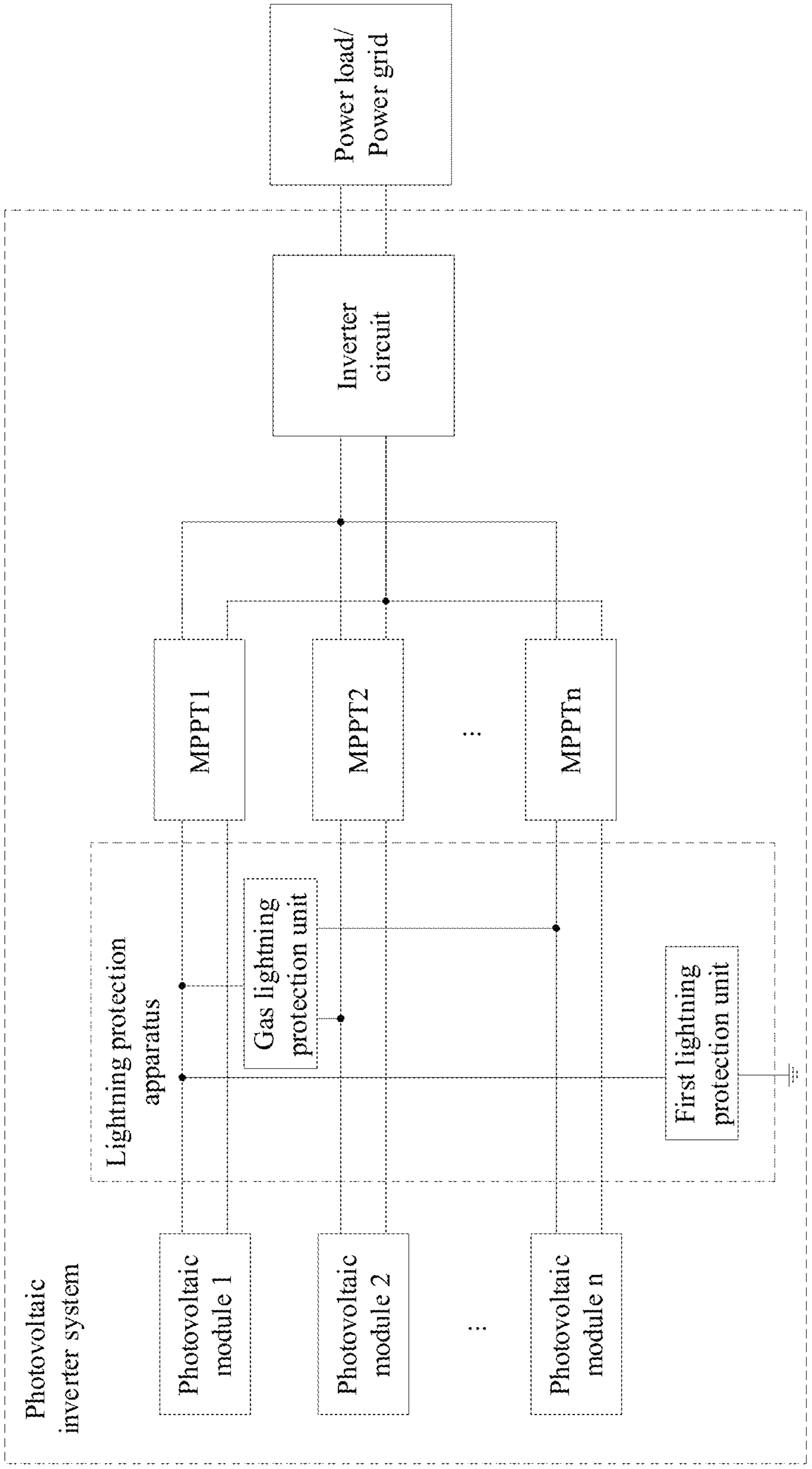
FIG. 3 is a schematic diagram of a structure of another photovoltaic inverter system according to an embodiment of this application.

In a possible embodiment, the DC/DC conversion circuit may be an MPPT apparatus in a photovoltaic inverter system. As shown in FIG. 3, a terminal of the photovoltaic module is directly connected to a terminal of the one or more other photovoltaic module that has a same polarity as the terminal of the photovoltaic module through the MPPT apparatus, an electric potential difference between two terminals of the gas lightning protection unit is small, and when no lightning strike current enters, no other current that causes the gas lightning protection unit to work abnormally is transmitted to the gas lightning protection unit.

In addition, because the gas discharge tube is small in size, a size of the lightning protection apparatus is reduced, a size of the lightning protection apparatus is effectively reduced, and manufacturing costs are reduced.

The following further describes a structure of the photovoltaic inverter system in this application in detail.

Figure 4:
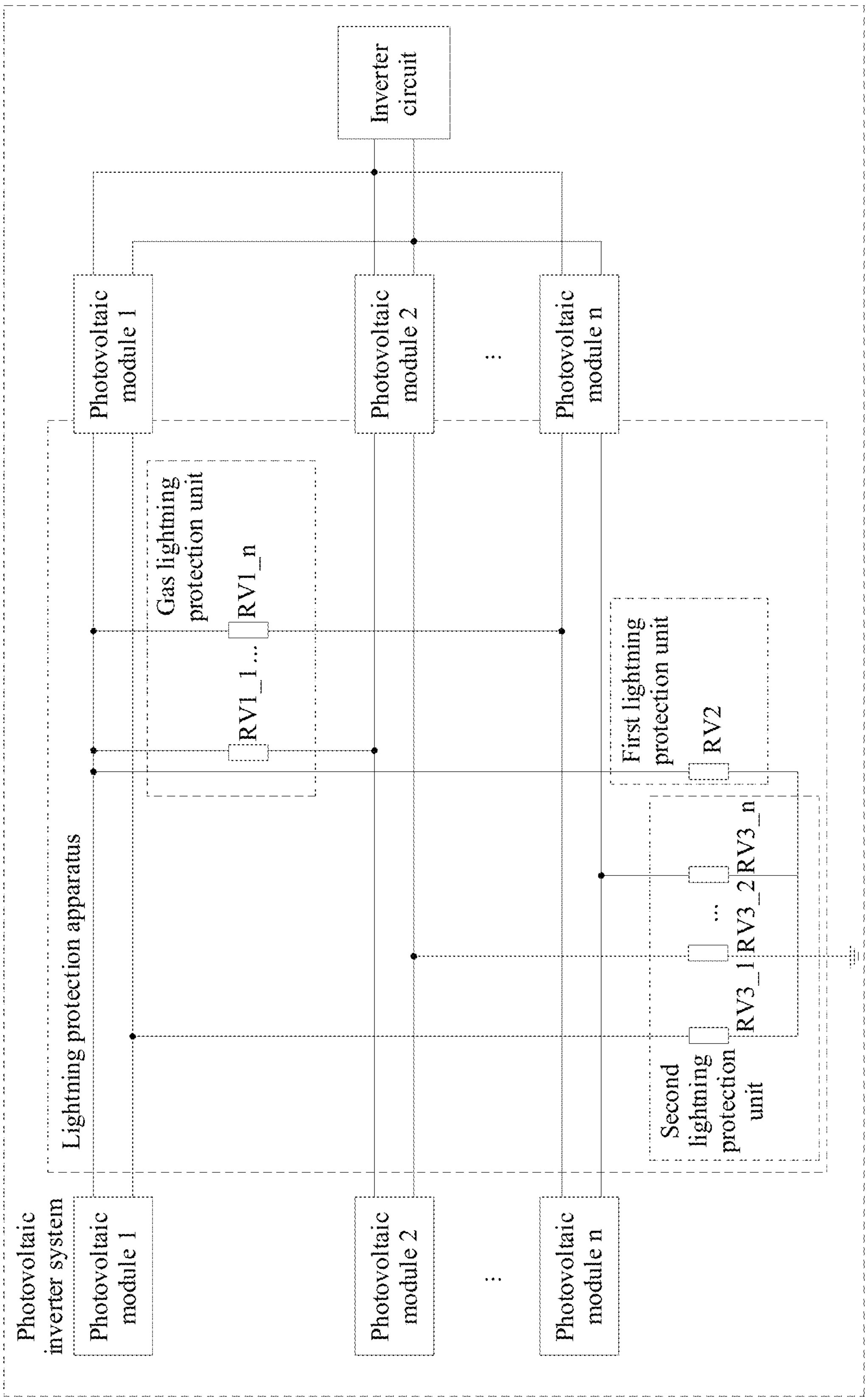
FIG. 4 is a schematic diagram of a structure of another photovoltaic inverter system according to an embodiment of this application.

In a possible embodiment, as shown in FIG. 4, the gas lightning protection unit includes at least one gas lightning protection branch circuit. The gas lightning protection branch circuit includes a gas lightning protection device RV1 (gas lightning protection devices RV1_1 to RV**1_*n* are used as an example in FIG. 4**). A first terminal of each gas lightning protection branch circuit forms a first terminal of the gas lightning protection unit, and a second terminal of each gas lightning protection branch circuit forms a second terminal of the gas lightning protection unit.

When a voltage of a lightning strike current is higher than a breakdown voltage of the gas discharge tube, the gas discharge tube is transiently short-circuited, and leads to the ground for discharging, a lightning strike current introduced by a first terminal of any one of the one or more other photovoltaic module and a lightning strike current introduced by a first terminal of the photovoltaic module.

In addition, compared with a lightning arrester or a varistor used by a conventional lightning protection apparatus, the gas discharge tube has characteristics of low cost and small size.

In a possible embodiment, as shown in FIG. 4, the first lightning protection unit includes a lightning protection device RV2.

Compared with a conventional lightning protection apparatus structure, the lightning protection apparatus structure disclosed in this application implements sharing of the lightning protection device RV2. The lightning protection device RV2 may discharge a lightning strike current introduced by a first terminal of any one of the one or more other photovoltaic module, and may also discharge a lightning strike current introduced by the first terminal of the photovoltaic module.

In a possible embodiment, as shown in FIG. 4, the lightning protection apparatus further includes a second lightning protection unit. A first terminal of the second lightning protection unit is separately connected to a second terminal of the photovoltaic module and a second terminal of each of the one or more other photovoltaic module, and a second terminal of the second lightning protection unit is connected to the grounding terminal.

The second lightning protection unit is configured to transmit a third current to the grounding terminal, where the third current is a lightning strike current introduced by the second terminal of the photovoltaic module or a second terminal of any one of the one or more other photovoltaic module.

The second lightning protection unit includes at least two first lightning protection branch circuits. The first lightning protection branch circuit includes a first lightning protection device (gas lightning protection devices RV3_1 to RV3_*n* are used as an example in FIG. 4). A first terminal of each first lightning protection branch circuit forms the first terminal of the second lightning protection unit, and a second terminal of each first lightning protection branch circuit forms the second terminal of the second lightning protection unit.

When a lightning strike current is introduced from a power generation apparatus, a lightning strike current of a common-mode type or a lightning strike current of a differential-mode type may be formed depending on different return paths. When a lightning strike current is of the common-mode type, the foregoing lightning protection apparatus may effectively perform lightning protection. When the lightning strike current is of the differential-mode type, a grounding lightning protection unit needs to be configured in the lightning protection apparatus for discharging.

Figure 5:
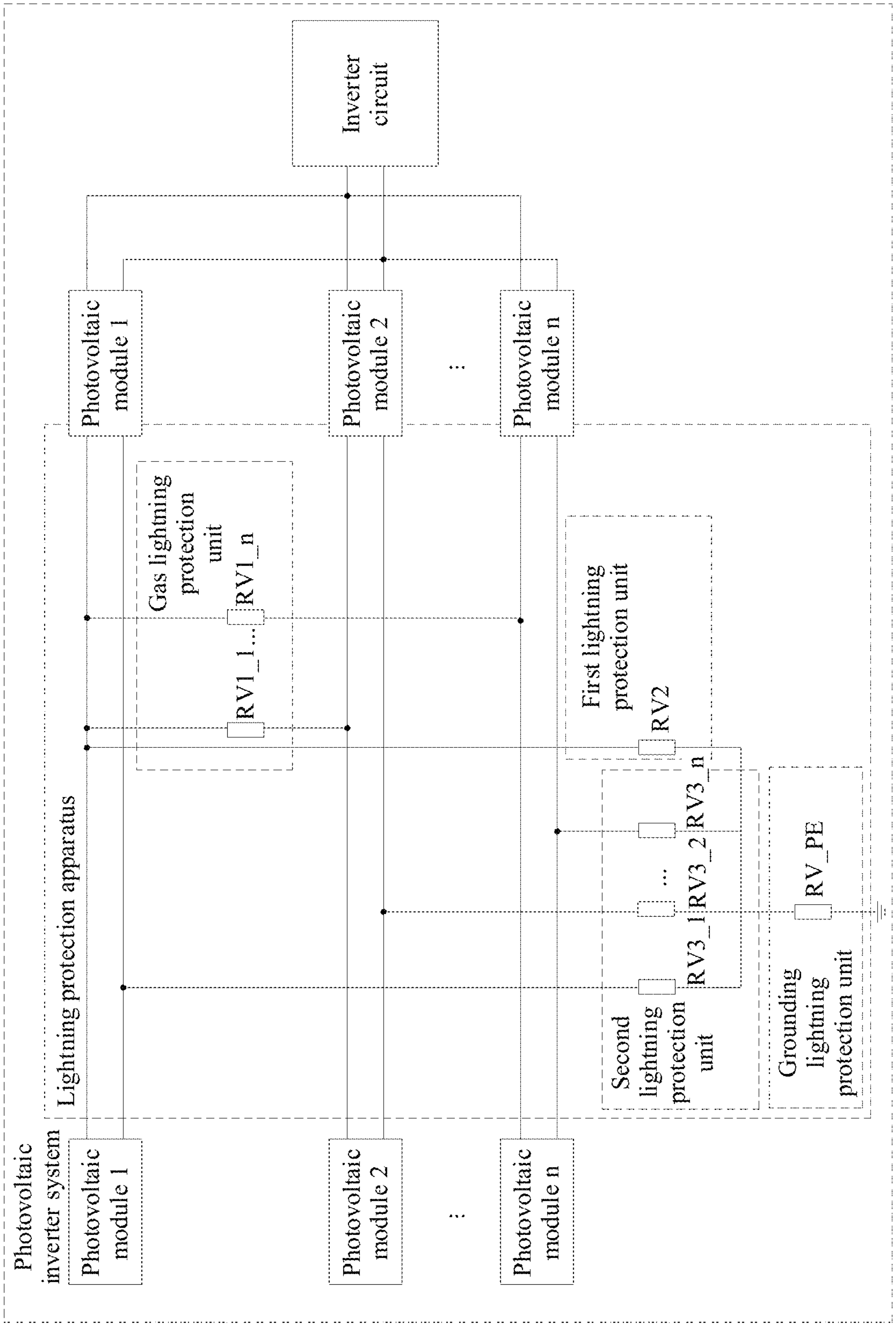
FIG. 5 is a schematic diagram of a structure of another photovoltaic inverter system according to an embodiment of this application.

In a possible embodiment, as shown in FIG. 5, the grounding lightning protection unit includes a grounding lightning protection device RV_PE. A first terminal of the grounding lightning protection unit is separately connected to a second terminal of the first lightning protection unit and the second terminal of the second lightning protection unit, and a second terminal of the grounding lightning protection unit is connected to the grounding terminal.

The grounding lightning protection unit is configured to transmit a received fourth current to the grounding terminal, where the fourth current is the second current of a differential-mode type or the third current of a differential-mode type.

In conclusion, when a lightning strike current enters the inverter system, the gas lightning protection unit may be configured to transmit, to the first lightning protection unit, a lightning strike current introduced by the first terminal of any one of the one or more other photovoltaic module, to discharge the lightning strike current to the grounding terminal through the first lightning protection unit; the first lightning protection unit may also be configured to discharge, to the grounding terminal, a lightning strike current introduced by the first terminal of the photovoltaic module; the second lightning protection unit may also be configured to discharge a lightning strike current introduced by the second terminal of the photovoltaic module or a lightning strike current introduced by a second terminal of the one or more other photovoltaic module; and the grounding lightning protection unit may be configured to discharge a differential-mode current.

On the basis that a lightning protection function can be implemented, the lightning protection apparatus disclosed in this application uses fewer lightning arresters or varistors. For example, when the number of inputs of the inverter circuit is n, a conventional lightning protection apparatus needs (n+1) lightning arresters or varistors. However, the lightning protection apparatus disclosed in this application needs (n/2+2) lightning arresters or varistors and (n/2−1) gas discharge tubes. By comparison, a quantity of used large-size lightning protection devices is reduced, space occupied by the lightning protection apparatus is reduced, the size of the photovoltaic inverter system is reduced, installation is convenient, and manufacturing costs are reduced.

Based on a same concept, this application further provides a lightning protection apparatus. For implementations of the lightning protection apparatus, refer to the implementations of the foregoing photovoltaic inverter system. Details are not described again.

It is clear that a person skilled in the art can make various modifications and variations to this application without departing from the scope of this application. This application is intended to cover these modifications and variations of this application provided that they fall within the scope of protection defined by the claims and their equivalent technologies.

What is claimed is:

1. A photovoltaic inverter system, comprising a lightning protection apparatus, a plurality of DC/DC conversion circuits, and an inverter circuit, wherein a positive input terminal of each of the plurality of DC/DC conversion circuits is configured to connect to a positive output terminal of a first photovoltaic module;

a negative input terminal of each of the plurality of DC/DC conversion circuits is configured to connect to a negative output terminal of the first photovoltaic module;

positive output terminals of the plurality of DC/DC conversion circuits are connected in parallel, and negative output terminals of the plurality of DC/DC conversion circuits are connected in parallel;

the positive output terminals of the plurality of DC/DC conversion circuits and the negative output terminals of the plurality of DC/DC conversion circuits are connected to input terminals of the inverter circuit;

an output terminal of the inverter circuit is configured to connect to a power load;

the lightning protection apparatus comprises a gas lightning protection unit and a first lightning protection unit, wherein the gas lightning protection unit comprises at least one gas discharge tube;

a first terminal of the gas lightning protection unit is connected to a first terminal of the first photovoltaic module, each of at least one second terminal of the gas lightning protection unit is connected to a first terminal of at least one second photovoltaic module, wherein the at least one second photovoltaic module is different from the first photovoltaic module, and the first lightning protection unit is connected between the first terminal of the first photovoltaic module and a grounding terminal;

the gas lightning protection unit is configured to transmit a first current to the first lightning protection unit, wherein the first current is a lightning strike current introduced by a first terminal of any one of the at least one second photovoltaic module; and the first lightning protection unit is configured to transmit the first current and/or a second current to the grounding terminal, wherein the second current is a lightning strike current introduced by the first terminal of the first photovoltaic module, the first terminal of the first photovoltaic module is the positive output terminal of the first photovoltaic module or the negative output terminal of the first photovoltaic module, and the first terminal of the at least one second photovoltaic module is an output terminal having a same polarity as the first terminal of the first photovoltaic module.

2. The photovoltaic inverter system according to claim 1, wherein the gas lightning protection unit comprises at least one gas lightning protection branch circuit, wherein each gas lightning protection branch circuit comprises a gas discharge tube, a first terminal of each gas lightning protection branch circuit forms at least one first terminal of the gas lightning protection unit, and a second terminal of each gas lightning protection branch circuit forms the at least one second terminal of the gas lightning protection unit.

3. The photovoltaic inverter system according to claim 1, wherein the lightning protection apparatus further comprises a second lightning protection unit:

at least two first terminals of the second lightning protection unit are separately connected to a second terminal of the first photovoltaic module and a second terminal of each of the at least one second photovoltaic module, and a second terminal of the second lightning protection unit is connected to the grounding terminal; and the second lightning protection unit is configured to transmit a third current to the grounding terminal, wherein the third current is a lightning strike current introduced by the second terminal of the first photovoltaic module or the second terminal of any one of the at least one second photovoltaic module.

4. The photovoltaic inverter system according to claim 3, wherein the second lightning protection unit comprises at least two lightning protection branch circuits, each of the at least two lightning protection branch circuits comprises a lightning protection device, a first terminal of each lightning protection branch circuit forms the at least two first terminals of the second lightning protection unit, and a second terminal of each of the at least two lightning protection branch circuits together forms the second terminal of the second lightning protection unit.

5. The photovoltaic inverter system according to claim 3, wherein the lightning protection apparatus further comprises a grounding lightning protection unit;

a first terminal of the grounding lightning protection unit is separately connected to a second terminal of the first lightning protection unit and the second terminal of the second lightning protection unit, and a second terminal of the grounding lightning protection unit is connected to the grounding terminal; and the grounding lightning protection unit is configured to transmit a received fourth current to the grounding terminal, wherein the fourth current is a differential-mode type second current or a differential-mode type third current.

6. A lightning protection apparatus, comprised in a photovoltaic inverter system, wherein the photovoltaic inverter system further comprises a plurality of DC/DC conversion circuits and an inverter circuit, a positive input terminal each of the plurality of DC/DC conversion circuits kl configured to connect to a positive output terminal of a first photovoltaic module;

a negative input terminal of each of the plurality of DC/DC conversion circuits is configured to connect to a negative output terminal of the first photovoltaic module;

positive output terminals of the plurality of DC/DC conversion circuits are connected in parallel, and negative output terminals of the plurality of DC/DC conversion circuits are connected in parallel;

the positive output terminals of the plurality of DC/DC conversion circuits and the negative output terminals of the plurality of DC/DC conversion circuits are connected to input terminals of the inverter circuit;

an output terminal of the inverter circuit is configured to connect to a power load;

the lightning protection apparatus comprises a gas lightning protection unit and a first lightning protection unit, wherein the gas lightning protection unit comprises at least one gas discharge tube;

a first terminal of the gas lightning protection unit is connected to a first terminal of the first photovoltaic module, each of at least one second terminal of the gas lightning protection unit is connected to a first terminal of each of at least one second photovoltaic module, wherein the at least one second photovoltaic module is different from the first photovoltaic module, and the first lightning protection unit is connected between the first terminal of the first photovoltaic module and a grounding terminal;

the gas lightning protection unit is configured to transmit a first current to the first lightning protection unit, wherein the first current is a lightning strike current introduced by a first terminal of any one of the at least one second photovoltaic module; and the first lightning protection unit is configured to transmit the first current and/or a second current to the grounding terminal, wherein the second current is a lightning strike current introduced by the first terminal of the fit photovoltaic module, the first terminal of the first photovoltaic module is h positive output terminal of the first photovoltaic module or the negative output terminal of the first photovoltaic module, and the first terminal of the at least one second photovoltaic module is an output terminal having a same polarity as the first terminal of the first photovoltaic module.

7. The lightning protection apparatus according to claim 6, wherein the gas lightning protection unit comprises at least one gas lightning protection branch circuit, each gas lightning protection branch circuit comprises a gas discharge tube, a first terminal of each gas lightning protection branch circuit forms at least one first terminal of the gas lightning protection unit, and a second terminal of each gas lightning protection branch circuit forms the at least one second terminal of the gas lightning protection unit.

8. The lightning protection apparatus according to claim 6, wherein the lightning protection apparatus further comprises a second lightning protection unit;

at least two first terminals of the second lightning protection unit are separately connected to a second terminal of the first photovoltaic module and a second terminal of each of the at least one second photovoltaic module, and a second terminal of the second lightning protection unit is connected to the grounding terminal; and the second lightning protection unit is configured to transmit a third current to the grounding terminal, wherein the third current is a lightning strike current introduced by the second terminal of the first photovoltaic module or the second terminal of any one of the at least one second photovoltaic module.

9. The lightning protection apparatus according to claim 8, wherein the second lightning protection unit comprises at least two lightning protection branch circuits, each of the at least two lightning protection branch circuits comprises a lightning protection device, a first terminal of each lightning protection branch circuit forms the at least two first terminals of the second lightning protection unit, and a second terminal of each of the at least two lightning protection branch circuits together forms a second terminal of the second lightning protection unit.

10. The lightning protection apparatus according to claim 8, wherein the lightning protection apparatus further comprises a grounding lightning protection unit;

a first terminal of the grounding lightning protection unit is separately connected to a second terminal of the first lightning protection unit and the second terminal of the second lightning protection unit, and a second terminal of the grounding lightning protection unit is connected to the grounding terminal; and the grounding lightning protection unit is configured to transmit a received fourth current to the grounding terminal, wherein the fourth current is a differential-mode type second current or a differential-mode type third current.

11. The photovoltaic inverter system according to claim 1, wherein the output terminal of the inverter circuit is configured to connect to a power grid.

12. The lightning protection apparatus according to claim 6, wherein the output terminal of the inverter circuit is configured to connect to a power grid.

13. The photovoltaic inverter system according to claim 1, wherein the at least one gas discharge tube has a starting voltage lower than a voltage of a lightning strike current.

14. The lightning protection apparatus according to claim 6, wherein the at least one gas discharge tube has a starting voltage lower than a voltage of a lightning strike current.

15. The photovoltaic inverter system according to claim 1, wherein the plurality of DC/DC conversion circuits are a plurality of maximum power point tracking (MPPT) apparatus.

16. The lightning protection apparatus according to claim 6, wherein the plurality of DC/DC conversion circuits are a plurality of maximum power point tracking (MPPT) apparatus.

* * * * *